May 7, 1963  F. SBROJAVACCA  3,088,241

INSECT-REPELLING DEVICE

Filed March 27, 1961

Inventor

Francesco Sbrojavacca

By Stevens Davis Miller & Mosher
Attorneys 3,088,241
Patented May 7, 1963

3,088,241
INSECT-REPELLING DEVICE
Francesco Sbrojavacca, Via 10 Borgonuovo, Milan, Italy
Filed Mar. 27, 1961, Ser. No. 98,637
Claims priority, application Italy Mar. 31, 1960
1 Claim. (Cl. 45—15)

This invention is for an insect-repelling device, and, more particularly, for a support for containers holding edible materials to which it is desired to prevent access of wingless, predaceous or harvesting insects.

In practical husbandry, the necessity is often felt of impeding that wingless, predaceous or harvesting insects, or those insects which live prevailingly on the ground or burrow underground may destroy or contaminate edible materials: typical examples of these insects are the common ants and all the members of Formicidae family in general. It is known that these insects are capable of readily finding their way to places in which food or agricultural produce is stored or processed: for example they infest pots or containers in which vegetable or fruit preserves, jam, jellies and the like are prepared. Under these circumstances, no practical remedy has been envisaged heretofore, since the usual insecticides and pesticides cannot be used in the neighborhood of edible substances to which said pesticides could very likely impart unpleasant odors or tastes, apart, of course, from their toxicity which could make their practical use impossible.

Thus, the adoption of, so to speak, mechanical repelling means is virtually imperative.

It is not superfluous to add, at this stage, that the device according to this invention is not an insect-trap in the proper acception of the word: it does not catch the insects, but, rather, it causes them to swerve from their intended route towards the naturally luring edible materials.

According to my said invention, I provide a device for preventing the access of wingless, predaceous insects to containers holding edible materials, comprising: a base member of generally frusto-conical shape having its outer surface of concave configuration with upwardly directed concavity, said base member being terminated in its upper portion by a horizontal annular resting surface and by a cylindrical, outwardly screw-threaded, projection; an intermediate horizontal disc-like member having an acute angular cross-sectional shape with the angular edge pointing outwardly, said intermediate disc-like member resting with its inner peripheral surface on said horizontal annular resting surface of said base member, and a top member consisting of a downwardly belled-out box-like structure having a cylindrical, inwardly screw-threaded projection for screwably connecting said base member to said top member with said intermediate disc-like member therebetween, said base member and said top member defining an annular chamber in which said intermediate disc-like member is totally enclosed.

A preferred embodiment of my said invention is illustrated, by way of example only, in the drawings accompanying this specification.

Figure 1:
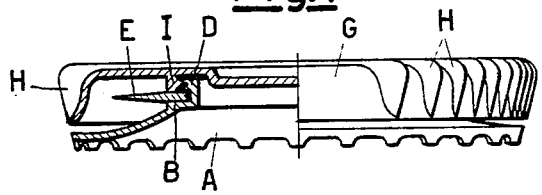
FIG. 1 is an elevational view, partly in cross-section, of the insect repelling device of my invention.

Having first reference to FIG. 1 of the accompanying drawings, it will be seen that A is a general designation of the base member which rests on the ground with its lower edge: this edge can be either smooth or toothed or also scalloped as shown in the drawing FIG. 1. The outer surface A is of arcuate configuration and its concave face is directed upwardly. The base member A provides an upper resting surface or abutment B, horizontally located, and provided with one or more teeth or projections C, best seen in FIG. 2, arranged along its periphery. The member A is terminated in its upper peripheral inner portion by a neck piece D which is screw-threaded on its outer surface.

Figure 3:
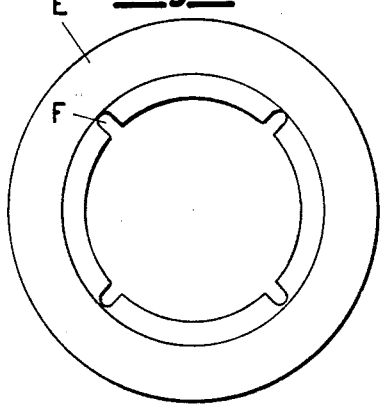
FIG. 3 is a plan view of the intermediate disc-like member.
Figure 4:
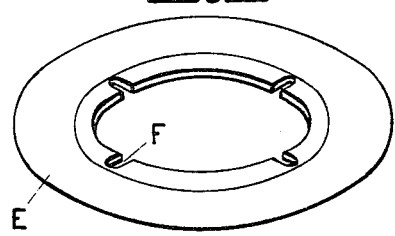
FIG. 4 is a perspective view of the intermediate disc-like member or blade of FIG. 3.

The abutment B affords a seating to a disc-like member or blade E: the inner edge of E has notches F, intended to engage the teeth or projections C of B aforementioned. A top member, generally in the form of a box (any desired outline can be chosen for it) and connoted by the reference character G in the drawings accompanying this specification is inwardly and downwardly terminated by an internally screw-threaded neck portion I. In practical use, the disc-like member E is placed on the resting surface B and thereafter the screw-threaded portion I is screwably affixed to the screw-threaded neck D so as to clamp the disc or blade member E therebetween. This blade member has been defined as a disc-like member and can have any desired outline, copying that of the box structure G: for both, one can choose among the circular, square, rectangular or polygonal outlines. The outer edge of E is shown smooth in FIGS. 3 and 4 but can also be toothed, scalloped or crenellated if so desired.

Figure 2:
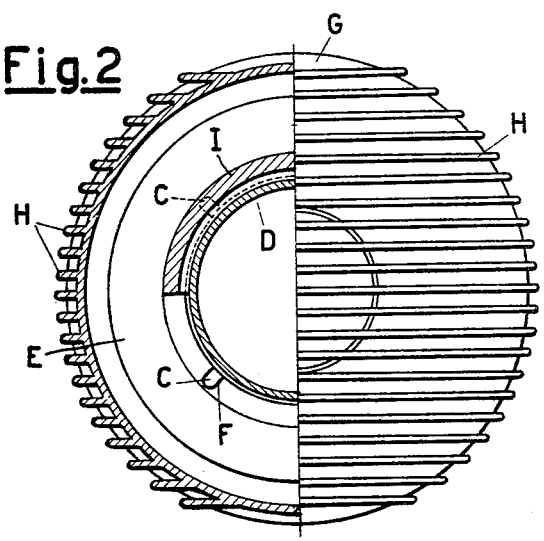
FIG. 2 is a plan view, also partly in section.

The preferable practical use of the device of the invention is as a support for the containers holding the edible materials that one desires to protect from ravaging by insects. Thus, for example, a jam pot can simply be placed on the top of the device, there being the absolute safety that any access of the insects thereto is barred. Supposing that the edible materials to be protected are randomly placed on a kitchen table, it is necessary to have at hand as many devices as there are legs in the table and place each leg of the table on one of said devices. It is hardly necessary to add that the top portion of the device must afford the necessary robustness for these uses: FIGS. 1 and 2 show reinforcing ribs H whose provision is, however, quite optional.

The operation of the device is extremely simple: as a matter of fact, if insects attempt to creep on the device, they can possibly succeed in creeping along the arcuate portion of the base member but the outwardly jutting blade member prevents their further climbing towards the edible materials. Moreover, it is possible to smear the blade member with insect repelling substances, the vapors thereof are thus caused to fill the annular chamber defined by the base member and the top member aforementioned.

What I claim is:

In a device for preventing the access of wingless, predaceous insects to containers holding edible materials, of the kind which comprises a base member of generally frustoconical shape having its outer surface of concave configuration with upwardly directed concavity and a top member consisting of an inverted cup-shaped member, the combination consisting of:

(a) a first ring-shaped, outwardly screw-threaded projection on the top portion of said base member;

(b) a second ring-shaped, inwardly screw-threaded projection downwardly depending from said top member and adapted to engage screwably said first outwardly screw-threaded projection;

(c) an annular horizontal resting surface on said base member, outwardly directed and located adjacent said first outwardly screw-threaded projection of said base member and forming an integral part thereof; and (d) a disc-like horizontal member having an acute angular cross-sectional shape with the angular edge pointing outwardly and adapted to rest on said annular resting surface in clamped engagement between said annular resting surface and said second ring-shaped inwardly screw-threaded projection by screwably engaging said first and said second screw-threaded projections whereby said disc-like member provides a barrier which cannot be surmounted by wingless, predaceous insects and thereby prevents access by such insects from said base member to said top member.

References Cited in the file of this patent
UNITED STATES PATENTS

| | | |
|---|---|---|
| 56,008 | Clarke | July 3, 1866 |
| 1,402,998 | Anderson | Jan. 10, 1922 |

FOREIGN PATENTS

| | | |
|---|---|---|
| 110,351 | Australia | Apr. 9, 1940 |